(12) United States Patent
Nierzwick et al.

(10) Patent No.: US 7,995,792 B2
(45) Date of Patent: Aug. 9, 2011

(54) PARENTAL MONITORING METHOD USING PERIODIC IMAGE SAMPLING

(75) Inventors: Mark Nierzwick, Brownsburg, IN (US); Ronald Thomas Keen, Indianapolis, IN (US)

(73) Assignee: Shenzhen TCL New Technology Ltd, Shenzhen, Guangdong (CN)

( * ) Notice: Subject to any disclaimer, the term of this patent is extended or adjusted under 35 U.S.C. 154(b) by 968 days.

(21) Appl. No.: 11/865,408

(22) Filed: Oct. 1, 2007

(65) Prior Publication Data

US 2009/0087015 A1 Apr. 2, 2009

(51) Int. Cl.
*G06K 9/00* (2006.01)
*H04N 5/16* (2006.01)

(52) U.S. Cl. .......................... 382/100; 382/291; 348/694

(58) Field of Classification Search .................. 382/103, 382/112, 113, 114, 115, 116, 117, 118, 119, 382/155, 156, 172, 181, 189, 191, 276, 305, 382/312, 317, 318, 321, 321.291; 725/25, 725/14; 340/539.15; 709/224; 705/14; 348/566, 348/694

See application file for complete search history.

(56) References Cited

U.S. PATENT DOCUMENTS

| 4,660,084 A * | 4/1987 | Filliman et al. ............... 348/694 |
| 5,872,588 A * | 2/1999 | Aras et al. ....................... 725/14 |
| 5,907,369 A * | 5/1999 | Rumreich et al. ............. 348/566 |
| 7,039,700 B2 * | 5/2006 | Saeidi ............................ 709/224 |
| 7,046,139 B2 * | 5/2006 | Kuhn et al. ............... 340/539.15 |
| 2003/0040962 A1 * | 2/2003 | Lewis ............................. 705/14 |
| 2005/0240959 A1 * | 10/2005 | Kuhn et al. ..................... 725/25 |

* cited by examiner

*Primary Examiner* — Seyed Azarian
(74) *Attorney, Agent, or Firm* — Fletcher Yoder

(57) ABSTRACT

There is provided a system and/or method of monitoring media content. More specifically, in one embodiment, there is provided a method of monitoring operation of an electronic device having a plurality of signal inputs, the method comprising periodically collecting images from each of the plurality of signal inputs, storing the collected images for later evaluation if an image storage option is enabled, and sending the collected images for direct viewing if the image storage option is not enabled.

23 Claims, 2 Drawing Sheets

PARENTAL MONITORING METHOD USING PERIODIC IMAGE SAMPLING

BACKGROUND

This section is intended to introduce the reader to various aspects of art which may be related to various aspects of embodiments of the present invention that are described below. This discussion is believed to be helpful in providing the reader with background information to facilitate a better understanding of the various aspects of the present invention. Accordingly, it should be understood that these statements are to be read in this light, and not as admissions of prior art.

There are several monitoring systems on the market today designed to monitor and control television use and viewing, such as the V-chip. Traditional monitoring systems may be programmed to prevent a viewer from accessing a designated program or type of program, also referred to as "blocking" a program. For example, parents may use traditional monitoring systems to block specific programs they deem inappropriate for their children or any programs assigned an adult-oriented rating. Thus, parents may use traditional monitoring system technology to control and monitor their children's access to programs.

There are disadvantages associated with traditional monitoring system technology. Monitoring systems that block programs of a particular rating may fail to block an unrated, but inappropriate, program. Conversely, monitoring systems may block a show that a user did not intend to block. Also, traditional monitoring systems are generally not compatible with all video sources, such as DVDs and other video inputs. Typically, the traditional monitoring systems are confusing and complicated for the ordinary television user. Accordingly, there is a need to improve monitoring television usage, especially in the parent-child dynamic.

DETAILED DESCRIPTION OF THE PREFERRED EMBODIMENT

Figure 1:
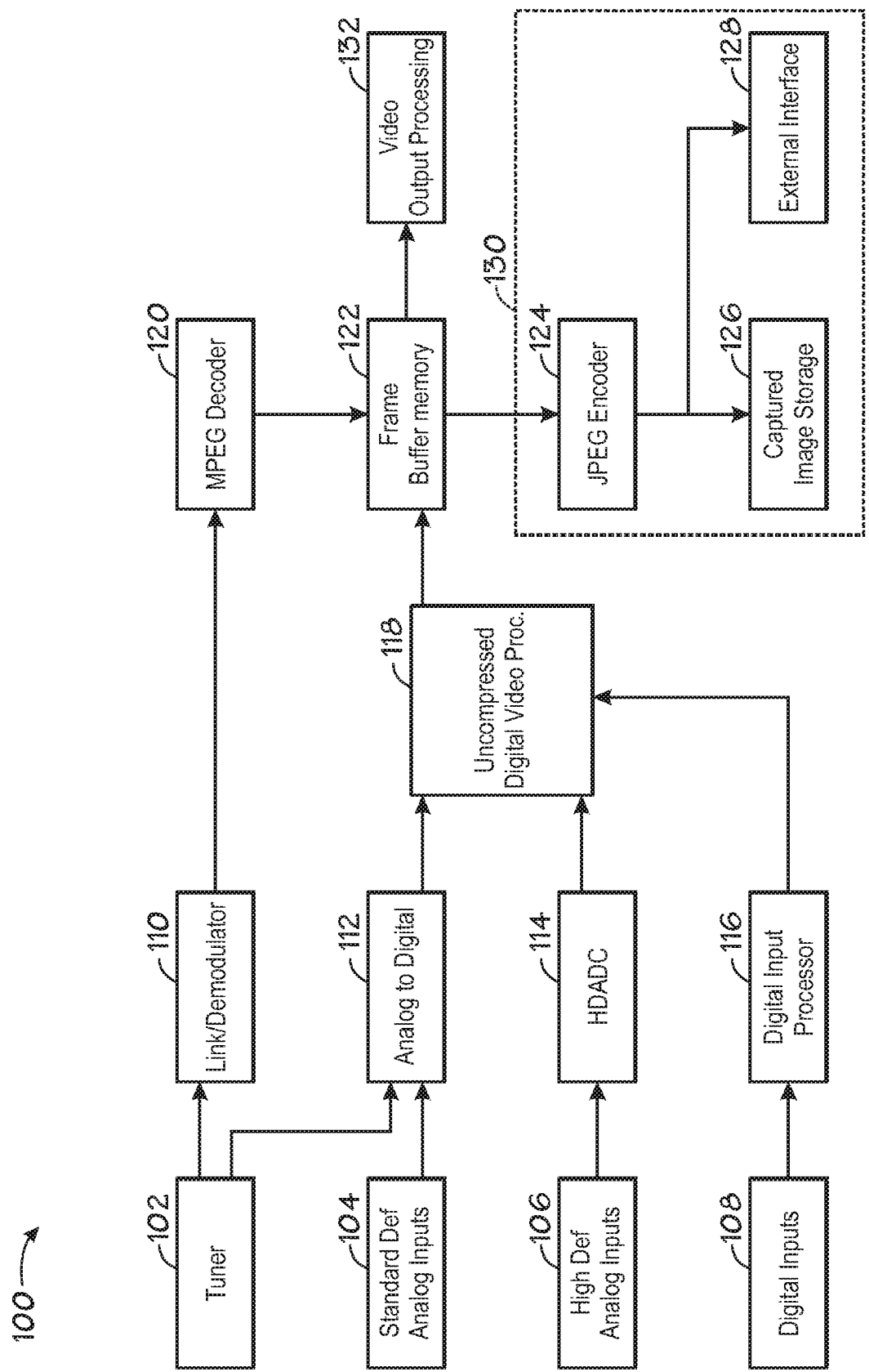
FIG. 1 is a block diagram of an electronic device that may employ an embodiment of the present invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

An embodiment of the present invention relates to an electronic device that receives, stores and displays images. For example, the electronic device may include a television or a computer that collects image samples from a media program (e.g., a web-browser or a television program) for monitoring either concurrently with presentation of the program or after the media program has been accessed or presented by the electronic device. The images may come from data carried in a plurality of inputs on the electronic device. The inputs may include a tuner, a standard definition analog input, a high definition analog input, and/or a digital input. The electronic device may also comprise a link/demodulator, an analog-to-digital converter, a HDADC, and a digital input processor. Once the data is processed, either by a MPEG or an uncompressed digital video processor, the data may enter a frame buffer memory. The data relating to the images may be collected by an image collection device at designated or default intervals. For example, data may be periodically collected from the frame buffer memory by the image collection device at intervals of one collection per minute. In an alternative embodiment, data may be collected if content being received exceeds a specific maturity level according to a standard rating system. For example, data may be collected from a particular input source if a program having a mature rating (TV-MA) is received via that input source.

In an exemplary embodiment, the image collection device comprises a JPEG encoder, a captured image storage feature, and an external interface. These features may enable the image collection device to display the images at a remote location and/or locally in substantially real-time and/or at a later time. This will facilitate user monitoring (e.g., parental monitoring) of programs presented via the electronic device. It should be noted that image selection, selection intervals, image storage and/or image display may be controlled by monitoring control logic. For example, a processor may cooperate with the monitoring control logic to perform functions (e.g., collection and display of sample images) in accordance with embodiments of the present invention.

FIG. 1 is a block diagram of an electronic device that may employ an exemplary embodiment of the present invention. The electronic device is generally indicated by reference numeral 100. The electronic device 100 may include a television, a set top box, a portable DVD player or the like. In the illustrated embodiment, the electronic device comprises various subsystems represented as functional blocks in FIG. 1. Those of ordinary skill in the art will appreciate that the various functional blocks shown in FIG. 1 may comprise hardware elements (including circuitry), software elements (including computer code stored on a machine-readable medium) or a combination of both hardware and software elements.

A signal source input may comprise a tuner 102, a standard definition analog input 104, a high definition analog input 106, a digital input 108, or the like. Those of ordinary skill in the art will appreciate that, although four signal source inputs are shown as being associated with the electronic device 100, the electronic device 100 may have more than four signal source inputs or fewer than four (e.g., one) signal source inputs. The signal source inputs 102, 104, 106, 108 are adapted to receive data that comprises image data (e.g., video data) and, in some cases, audio data. The signal received by one or more of the signal source inputs 102, 104, 106, and 108 may comprise a broadcast spectrum (e.g., if the signal source input comprises an antenna) or a single channel of video and/or audio data (e.g., if the signal source input comprises a DVD player or the like).

The tuner 102 is adapted to tune a particular video program from a broadcast signal. The tuner 102 may be configured to deliver the data to a link/demodulator 110. The link/demodulator 110 may include an electronic circuit used to recover the information content from the carrier wave of a signal typically used in connection with radio receivers as well as many other systems. Generally, link/demodulators, such as the link/ demodulator 110, are configured to change the amplitude, frequency or phase of a carrier signal in order to transmit information so as to comply with the input of the electronic device 100. The tuner 102 may also be configured to deliver the data to an analog-to-digital converter 112. The analog-to-digital converter 112 may include an electronic integrated circuit that converts continuous signals, such as analog voltage, to discrete digital numbers or digital output. The digital output may be in different coding schemes, such as binary and two's complement binary. However, some non-electronic or partially electronic devices, such as rotary encoders, can also be considered analog-to-digital converters.

In the exemplary embodiment shown in FIG. 1, the link/demodulator 110 delivers the processed data to an MPEG decoder 120, which may be representative of various types of data compression devices. The MPEG decoder 120 compresses the data (e.g., audio and visual data) received from the tuner 102. The MPEG decoder 120 may deliver the decoded data (e.g., audio and video data) to a frame buffer memory 122, as discussed in detail below. It should be noted that the data received from the tuner 102 is typically in the form of moving pictures or video. Thus, the MPEG decoder 120 generally employs digital video compression standards and file formats developed by the Moving Picture Experts Group (MPEG). However, those of ordinary skill in the art will appreciate that the illustrated MPEG decoder 120 may be representative of a feature that may be used to compress any data type that it would be beneficial to compress in accordance with present embodiments.

An analog input may comprise the standard definition analog input 104 and/or the high definition analog input 106. Generally, analog input refers to hardware interfaces that accept non-digital signals. The standard definition analog input 104 and the high definition analog input 106 transport the data as an analog signal, that is, by varying the amplitude and/or frequencies of the broadcast signal. One difference between the standard definition analog input 104 and the high definition analog input 106 is the resolution of display images that the respective analog inputs are configured to accept and transport. Specifically, the standard definition analog input 104 may accept and transport data with a standard resolution, while the high definition analog input 106 may accept and transport data with a high resolution. In accordance with one embodiment, the standard definition analog input 104 may deliver the data to the analog-to-digital converter 112, which is discussed above. In accordance with another embodiment, the high definition analog input 106 may deliver the data to a high definition analog-to-digital converter ("HDADC") 114. The HDADC 114 may be configured to convert high definition analog input signals to digital signals in a manner similar to that of the analog-to-digital converter 112.

Generally, the digital input 108 comprises any input capable of receiving a digital input signal. The digital input 108 is configured to transport the data, which typically includes audio and visual information, as a digital signal into the electronic device 100. Furthermore, the digital input 108 may receive digital modulation data, which may be digitally compressed. Those of ordinary skill in the art will appreciate that digital signals or data, provided to the digital input may come from a variety of sources, such as DVD players, CD players, digital video cameras, cell phones, and computers. In accordance with the exemplary embodiment shown in FIG. 1, the digital input 108 delivers the data to a digital input processor 116. The digital input processor 116 may include a specialized microprocessor designed specifically for digital signal processing. The digital input processor 116 may be used to measure or filter continuous real-world digital signals.

In the exemplary embodiment shown in FIG. 1, the analog-to-digital converter 112, the HDADC 114, and the digital input processor 116 all provide initial processing of the data. After the data is initially processed, the analog-to-digital converter 112, the HDADC 114, and the digital input processor 116 deliver the data to an uncompressed digital video processor 118. The uncompressed digital video processor 118 further filters and processes the data before delivering the data to a frame buffer memory 122. The frame buffer memory 122 is a memory buffer capable of holding a complete frame of data. The information in the frame buffer memory 122 may consist of color values for every pixel on a display screen (not independently shown).

Some embodiments of the present invention are directed to monitoring each of a plurality of media sources. For example, the frame buffer memory 122 may be configured to receive data from each of the signal source inputs. This may facilitate monitoring of various media sources. Indeed, a user may monitor media received via any of the signal source inputs. For example, a user may monitor the type of media supplied by a DVD player even though another type of media was being supplied via cable at the same time. In some embodiments, only media that is actually submitted for presentation on the electronic device 100 may be monitored.

In the exemplary embodiment, the frame buffer memory 122 is configured to deliver the data to a video output processing feature 132. The video output processing feature 132 is configured to provide the final processing on the data before the data is displayed as video data on a video display (not shown). Examples of video data that may be processed by the video output processing feature 132 include digital videos, a closed-circuit television feed, a feed from one or more wireless cameras, a feed from a camera in a remote location (e.g., a feed received via the Internet), or the like. Still other examples of video data that may be processed by the video output processing feature 132 include video conferencing (e.g., Skype), on-going video games, or other information such as weather data or the like. The video display may include a liquid crystal (LCD) display, a liquid-crystal-on-silicon (LCOS) display, a digital light projection (DLP) display or any other suitable display type. The video display may include a lighting source (not shown) that is used to generate a visible image on the display.

In accordance with one embodiment of the invention, images in the frame buffer memory 122 are captured in the form of still images by an image collection device 130. The image collection device 130 may comprise a JPEG encoder 124, a captured image storage feature 126, and an external interface 128. The JPEG encoder 124 may be configured to collect the video data from the frame buffer memory 122 and convert the video data to still images. Generally, the JPEG encoder 124 may include software that creates an image object, which may be encoded as a JPEG image file or the like, by compressing photographic images. Accordingly, during operation of one embodiment, while the frame buffer memory 122 delivers video data to the video output processor 132, the JPEG encoder 124 collects still images from the frame buffer memory 122 at periodic intervals. Alternatively, images may be collected from a particular source if a program exceeding a particular maturity level is received via that source. Thus, various samples of images from a media program (e.g., a television program) may be collected. The period or interval of image collection may be designated by a user. For example, a user may designate that a sample image is to be collected once every minute. Alternatively, the interval may be a default interval set by a manufacturer in a related software application. Collected images may be stored in a wide range of media, such as a flash drive, a floppy disk, an optical disk, a zip disk, a magnetic tape, a volatile memory, a non-volatile memory or the like.

The images collected by the JPEG encoder 124 may be stored in the captured image storage feature 126 as data. The captured image storage feature 126 may include a memory component that stores the data from the JPEG encoder 124 in an electronic file. For example, the captured image storage feature 126 may include a portable memory device (e.g., a flash memory device) that can facilitate direct viewing of its contents on the electronic device 100 or that can be transported to facilitate viewing of its contents on a computer or other device separate from the electronic device 100. In another example, the captured image storage feature 126 may include a hard drive in the electronic device 100 that may be accessed directly or via an external device (e.g., via the Internet). Those having ordinary skill in the art will appreciate that various methods of storing data in an electronic file may be employed in accordance with present embodiments. Once the data is stored, it may be accessed at a later time as desired by the user. The data may remain in storage until deleted by the user or until purged by an automated process in accordance with present embodiments. It should be noted that, in accordance with some embodiments, the images may be compressed to standard definition video or below to save storage space. Further, in some embodiments graphics may be included on the images indicating that they are for monitoring (e.g., parental monitoring). Such graphics may include a time and date stamp.

In some embodiments, an image or various images collected by the JPEG encoder 124 may be sent to an external interface 128. The external interface 128 may comprise a wireless network connection, an Ethernet connection, a Universal Serial Bus (USB) connection or any other suitable connection that allows the electronic device 100 to communicate with an external system. The external interface 128 may be used to deliver the data for immediate or substantially real-time display of the images at a remote location in conjunction with a corresponding presentation of the images on the electronic device 100. In other words, the external interface 128 may enable a remote user (e.g., a parent) to monitor what a local user (e.g., a child) is viewing on the device 100 in a substantially real-time scenario. Further, the external interface 128 may enable remote viewing of stored images. The images may be displayed on a device such as a liquid crystal (LCD) display, a liquid-crystal-on-silicon (LCOS) display, a digital light projection (DLP) display or any other suitable display type. The display may include a lighting source that is used to generate a visible image on the display.

Figure 2:
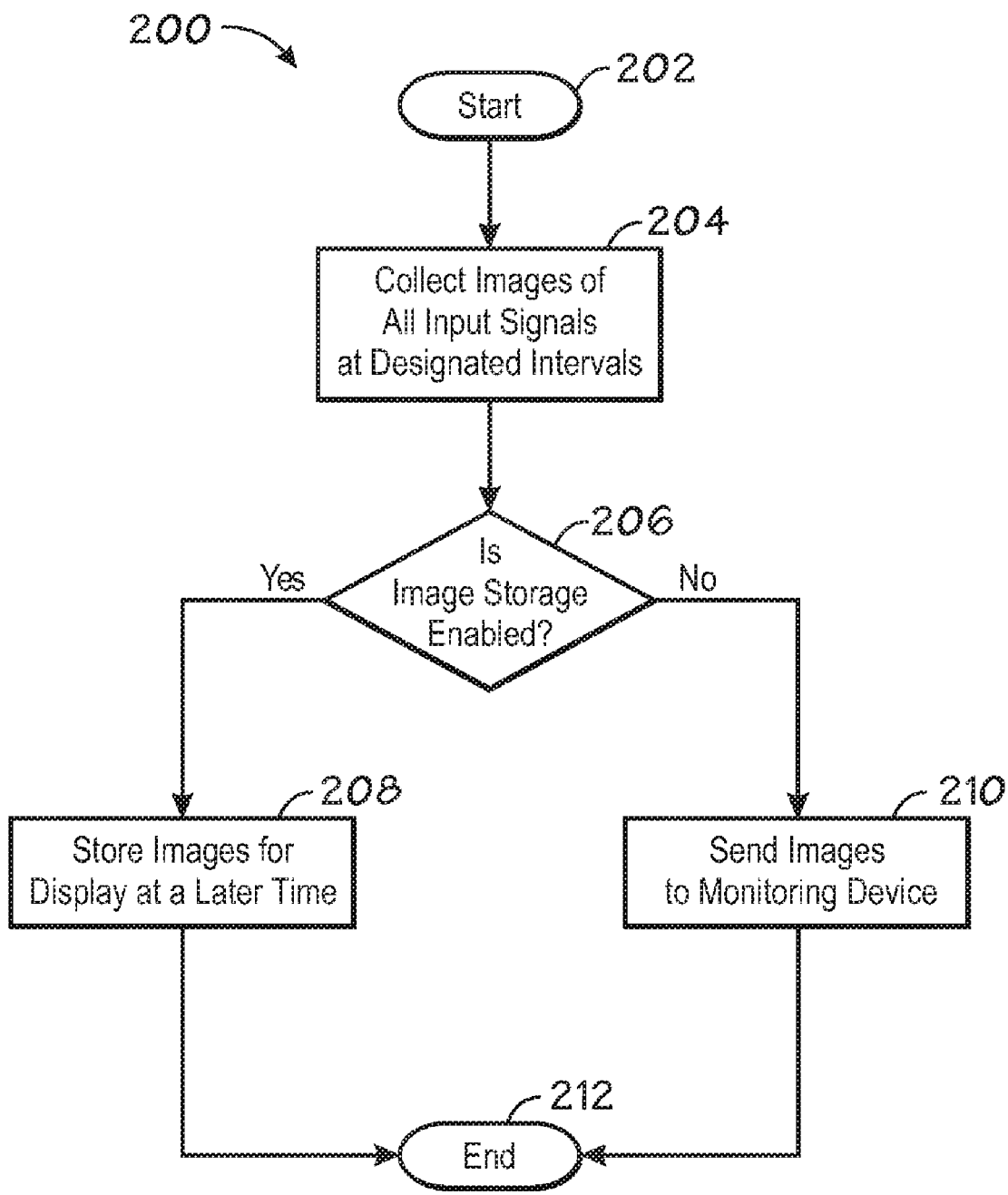
FIG. 2 is a process flow diagram illustrating a method in accordance with an embodiment of the present invention.

FIG. 2 is a process flow diagram illustrating a method in accordance with an exemplary embodiment of the present invention. The process is generally indicated by reference numeral 200. Block 202 represents initiation of the process 200. At block 204, images received from each of the input sources 102,104,106,108 (FIG. 1) are collected at designated intervals. By collecting images from all of the input sources, an exemplary embodiment of the present invention is able to prevent secret viewing of an input source that is not being monitored. As discussed above, the images may be derived from data corresponding to video images. Also, as discussed above, the collection intervals may vary depending on user input or based on default settings. At some point during the process, a determination is made as to whether image storage is enabled, as represented by block 206. For example, in the illustrated embodiment, block 206 may represent determining whether the captured image storage feature 126 (FIG. 1) is enabled after or during the image collection represented by block 204. If the captured image storage feature 126 (FIG. 1) is enabled, the images may be stored for display at a later time, as represented by block 208. The time between storage and displaying can vary. Indeed, a user may display the image immediately after the image is stored, the image may never be displayed, or the image may be accessed for display at a later time. The process then ends at block 212.

If the captured image storage feature 126 (FIG. 1) is not enabled (e.g., the user of the device has issued a command to disable the image storage feature 126), the images may be sent to a monitoring device, as represented by block 210. Indeed, in some embodiments the images may be both stored (block 208) and sent to a monitoring device (210), as would be understood by one of ordinary skill in the art. In one embodiment, the monitoring device may be accessed through the external interface 128 (FIG. 1) to retrieve stored images. In accordance with present embodiments, the images corresponding to the data received via the input signals may be viewed immediately after the signal is processed by the JPEG encoder 124 (FIG. 1). Those of ordinary skill in the art will appreciate that the time between the collection of images (block 204) and sending the images to a monitoring device (block 210) may depend on several factors such as the size of the image, band-width, and other variables that may create a delay. Thereafter, the process ends at block 212.

There are several useful applications of one or more of the exemplary embodiments of the present invention. For example, parents may use an exemplary embodiment of the present invention to monitor the television habits of their children. When a child watches a television broadcast, movie or similar media, images may be stored in the captured image storage feature 126. The parent may view the images directly using the external interface 128 or view the images at a later time using the electronic device 100. More specifically, the parent may utilize embodiments of the present invention to view a sampling of images that are either being displayed on the electronic device 100 in real-time or that have been collected. Thus, parents can use embodiments of the present invention to monitor what their children watch on the electronic device 100 (e.g., a television).

While embodiments of the present invention may be susceptible to various modifications and alternative forms, specific embodiments have been shown by way of example in the drawings and will be described in detail herein. However, it should be understood that the present embodiments are not intended to be limited to the particular forms disclosed. Rather, the invention is to cover all modifications, equivalents and alternatives falling within the spirit and scope of embodiments of the present invention as defined by the following appended claims.

The invention claimed is:

1. A method of monitoring operation of an electronic device having a plurality of signal inputs, the method comprising:
    periodically collecting images from each of the plurality of signal inputs of the electronic device, wherein the images are collected at a time interval that is specified by a user or at a default time interval;
    storing the collected images in a storage device for later evaluation if an image storage option is enabled; and
    sending the collected images for direct viewing if the image storage option is not enabled.

2. The method of claim 1, wherein collecting images from each of the plurality of signal inputs comprises collecting images from a tuner input, a standard definition analog input, a high definition analog input, and a digital input.

3. The method of claim 1, wherein the images are collected at the time interval that is specified by the user.

4. The method of claim 1, wherein the images are collected at the default time interval.

5. The method of claim 1, further comprising compressing the collected images prior to storing the collected images.

6. The method of claim 1, wherein the electronic device comprises a television.

7. The method of claim 1, comprising storing the collected images in a flash drive, a floppy disk, an optical disk, a zip disk, a magnetic tape, a volatile memory, or a non-volatile memory.

8. The method of claim 1, comprising displaying the collected images on a television or computer screen.

9. An electronic device, comprising:
a plurality of signal inputs; and
a processor configured to:
collect an image sample from data transmitted through any of the plurality of signal inputs that is receiving a program exceeding a particular maturity level, wherein the images are collected at a periodic time interval that is specified by a user or at a default time interval;
store the collected image samples in a storage device for later evaluation if an image storage option is enabled; and
send the collected image samples for direct viewing if the image storage option is not enabled.

10. The electronic device of claim 9, wherein the plurality of signal inputs comprises a tuner input, a standard definition analog input, a high definition analog input, and a digital input.

11. The electronic device of claim 9, wherein the images are collected at the periodic time interval that is specified by the user.

12. The electronic device of claim 9, wherein the images are collected at the default time interval.

13. The electronic device of claim 9, further comprising a data compression device configured to compress the collected image samples prior to storing the collected image samples.

14. The electronic device of claim 9, wherein the electronic device comprises a television.

15. The electronic device of claim 9, wherein the image storage device comprises a flash drive, a floppy disk, an optical disk, a zip disk, a magnetic tape, a volatile memory, or a non-volatile memory.

16. The electronic device of claim 9, wherein the processor is configured to display the collected images on a television or computer screen.

17. An electronic device having a plurality of signal inputs, the electronic device comprising:
means for periodically collecting images from each of the plurality of signal inputs, wherein the images are collected at a time interval that is specified by a user or at a default time interval;
means for storing the images for later evaluation if an image storage option is enabled; and
means for sending the images for direct viewing if the image storage option is not enabled.

18. The electronic device of claim 17, wherein the electronic device comprises a television.

19. The electronic device of claim 17, wherein the means for storing the images comprises a flash drive, a floppy disk, an optical disk, a zip disk, a magnetic tape, a volatile memory, or a non-volatile memory.

20. The electronic device of claim 17, wherein the means for collecting images comprises a JPEG encoder a captured image storage feature and an external interface.

21. A method of monitoring operation of an electronic device having a plurality of signal inputs, the method comprising:
periodically collecting images from each of the plurality of signal inputs of the electronic device;
compressing the collected images if an image storage option is enabled;
storing the compressed collected images in a storage device for later evaluation if the image storage option is enabled; and
sending the collected images for direct viewing if the image storage option is not enabled.

22. An electronic device, comprising:
a plurality of signal inputs;
a processor configured to:
collect an image sample from data transmitted through any of the plurality of signal inputs that is receiving a program exceeding a particular maturity level;
store the collected image samples in a storage device for later evaluation if an image storage option is enabled; and
send the collected image samples for direct viewing if the image storage option is not enabled; and
a data compression device configured to compress the collected image samples prior to storing the collected image samples.

23. An electronic device having a plurality of signal inputs, the electronic device comprising:
means for periodically collecting images from each of the plurality of signal inputs;
means for compressing the images if an image storage option is enabled;
means for storing the compressed images for later evaluation if the image storage option is enabled; and
means for sending the images for direct viewing if the image storage option is not enabled.

* * * * *